(12) United States Patent
Canham

(10) Patent No.: US 8,218,593 B2
(45) Date of Patent: Jul. 10, 2012

(54) OPTICAL DEVICES COMPRISING DOPED GLASS MATERIALS, LASER SYSTEMS INCLUDING SUCH OPTICAL DEVICES, AND METHODS OF FORMING SUCH OPTICAL DEVICES AND LASER SYSTEMS

(75) Inventor: John S. Canham, Ellicott City, MD (US)

(73) Assignee: Alliant Techsystems Inc., Arlington, VA (US)

( * ) Notice: Subject to any disclaimer, the term of this patent is extended or adjusted under 35 U.S.C. 154(b) by 482 days.

(21) Appl. No.: 12/179,391

(22) Filed: Jul. 24, 2008

(65) Prior Publication Data

US 2010/0022377 A1  Jan. 28, 2010

(51) Int. Cl.
*H01S 3/14* (2006.01)
*H01S 3/00* (2006.01)
*H01S 3/30* (2006.01)
*C03C 3/06* (2006.01)

(52) U.S. Cl. .......... 372/39; 372/2; 372/3; 372/6; 501/54
(58) Field of Classification Search .................... 501/54; 372/1–9, 40; 385/141, 142
See application file for complete search history.

(56) References Cited

U.S. PATENT DOCUMENTS

| | | | |
|---|---|---|---|
| 5,053,360 A | | 10/1991 | Myers |
| 5,225,925 A | | 7/1993 | Grubb et al. |
| 5,262,365 A | * | 11/1993 | Oyobe et al. .................... 501/54 |
| 5,379,149 A | | 1/1995 | Snitzer et al. |
| 5,949,935 A | | 9/1999 | Schaafsma et al. |
| 6,160,824 A | | 12/2000 | Meissner et al. |
| 6,297,179 B1 | | 10/2001 | Beall et al. |
| 6,304,711 B1 | * | 10/2001 | Samson et al. ................. 385/142 |
| 6,413,891 B1 | * | 7/2002 | Cho et al. ......................... 501/41 |
| 6,689,705 B2 | * | 2/2004 | Fujinoki et al. ................. 501/54 |
| 6,754,418 B1 | | 6/2004 | Holm et al. |
| 6,803,335 B2 | | 10/2004 | Hewak et al. |

(Continued)

FOREIGN PATENT DOCUMENTS

FR  2758321 A1  7/1998

(Continued)

OTHER PUBLICATIONS

Allenspacher et al., "Vacuum laser damage test bench," Proc. Of SPIE, vol. 5991, 599128-1 to 599128-9 (2005).

(Continued)

*Primary Examiner* — Jerry A Lorengo
*Assistant Examiner* — Noah Wiese
(74) *Attorney, Agent, or Firm* — TraskBritt

(57) ABSTRACT

Optical devices include a doped glass material in which the dopant facilitates the transmission of energy out from the glass material. The doped glass may not significantly absorb a selected wavelength of laser radiation to be manipulated by the optical devices. The dopant may comprise one or more of a transition metal element, an actinide element, and a lanthanide element. Laser systems include at least one such optical device and a laser device configured to emit a beam to be manipulated by the optical device. Methods for forming optical devices and laser systems including such optical devices include dispersing a dopant within a glass material to form, and forming the glass material into a body having a size and shape configured to manipulate a beam of radiation emitted by a laser device. The dopant is selected to comprise a material that facilitates the transmission of energy out from the glass material.

12 Claims, 3 Drawing Sheets

U.S. PATENT DOCUMENTS

| | | | |
|---|---|---|---|
| 7,016,593 | B2 | 3/2006 | Hewak et al. |
| 7,154,673 | B2 | 12/2006 | Tsukihara et al. |
| 7,155,099 | B2 | 12/2006 | Broderick et al. |
| 2002/0063952 | A1* | 5/2002 | Nyman et al. .......... 359/342 |
| 2004/0092378 | A1 | 5/2004 | Wolff et al. |
| 2006/0009109 | A1 | 1/2006 | Aitken et al. |
| 2007/0036509 | A1 | 2/2007 | Kakui et al. |
| 2007/0105702 | A1 | 5/2007 | Matsumoto et al. |
| 2007/0105704 | A1 | 5/2007 | Bookbinder et al. |
| 2007/0189346 | A1 | 8/2007 | Kawashima et al. |
| 2008/0053150 | A1 | 3/2008 | Moore et al. |

FOREIGN PATENT DOCUMENTS

| | | |
|---|---|---|
| WO | 2005064757 A1 | 7/2005 |

OTHER PUBLICATIONS

Becker et al., "Accelerated low fluence laser ageing of AR coatings," 11 pages (2005).

Campbell et al., "Nd-doped phosphate glasses for high-energy/high-peak-power lasers," Journal of Non-Crystalline Solids, 263&264, pp. 318-341 (2000).

Edwards et al., "Diagnostics and Evidence of Pre-catastrophic Damage in Transparent Solids," ASTM Spec. Tech. Pub. 469, ASTM, Philadelphia, PA, pp. 128-135 (1969).

Ginther et al, "Laser-Stimulated Thermoluminescence in Glass," Journal of Applied Physics, vol. 42, No. 11, pp. 4519-4521, (Oct. 1971).

Guntau et al., "Novel Method To Measure Bulk Absorption In Optically Transparent Materials," Rev. Sci. Instrum. 71, 2279 (Jun. 2000).

Canham, John S., Revisiting Mechanisms of Molecular Contamination Induced Laser Optic Damage, Proceedings of SPIE, Dec. 20, 2007, vol. 6720, 11 pages.

European Search Report for corresponding EP Patent Application No. 09163117, mailed Oct. 17, 2011.

* cited by examiner

OPTICAL DEVICES COMPRISING DOPED GLASS MATERIALS, LASER SYSTEMS INCLUDING SUCH OPTICAL DEVICES, AND METHODS OF FORMING SUCH OPTICAL DEVICES AND LASER SYSTEMS

FIELD

Embodiments of the invention generally relate to laser systems that include one or more optical devices, optical devices for use in laser systems, and to methods of fabricating such optical devices and laser systems.

BACKGROUND

Laser systems often include a laser device and one or more optical devices for manipulating the beam of coherent electromagnetic radiation emitted by the laser device. For example, laser systems may include optical devices such as lenses, windows, mirrors, prisms, wave plates, beam splitters, etc. These optical devices may be fabricated from glass materials such as, for example, silica ($SiO_2$) glass or borosilicate glass.

Laser systems that employ large, high-powered lasers may require the use of relatively large optical devices to manipulate the beam of electromagnetic radiation emitted by the lasers. Optical devices generally must be at least substantially homogeneous and relatively free of defects. The probability that an optical device will not meet required specifications (e.g., specifications relating to homogeneity and the presence of defects) upon fabrication thereof increases exponentially with the size of the optical device. As a result, the cost of optical devices also increases exponentially with size. Presently, one of the major costs in laser systems is the cost of the optical devices used to manipulate the beam of electromagnetic radiation emitted by the lasers.

It has been observed that optical devices in laser systems, after a period of use, may begin to exhibit damage that degrades the performance of the optical devices until they are no longer suitable for use. In essence, an optical device may have a limited useable lifetime that is at least partially a function of the radiation dose to which the optical device is subjected by a laser.

In view of the above, there is a need in the art for optical devices that exhibit relatively longer useful lifetimes, and for methods of fabricating such optical devices for laser systems.

BRIEF SUMMARY OF THE INVENTION

In some embodiments, the present invention includes optical devices that may be used to manipulate a beam emitted by a laser device. The optical devices include a glass material and at least one dopant in the glass material. The doped glass does not significantly absorb a selected wavelength of laser electromagnetic radiation to be manipulated by the optical device and facilitates the transmission of energy out from the glass material. In some embodiments, the dopant may comprise at least one of a transition metal element, an actinide element, and a lanthanide element. Furthermore, the concentration of the dopant within the glass material may be less than about two atomic percent (2.0 at %) in some embodiments.

In additional embodiments, the present invention includes laser systems that include a laser device and one or more optical devices positioned in a pathway of a beam of electromagnetic radiation to be emitted by the laser device. Each of the one or more optical devices has a composition that facilitates the transmission of energy out from the glass material. In some embodiments, each of the one or more optical devices includes a dopant dispersed within a glass material. The doped glass may not significantly absorb the wavelength of the beam of electromagnetic radiation to be emitted by the laser device, but may facilitate the transmission of energy out from the glass material.

In additional embodiments, the present invention includes methods of fabricating optical devices that may be used to manipulate a beam of radiation emitted by a laser. The methods include dispersing a dopant within a glass material. The dopant is selected to comprise a material that facilitates the transmission of energy out from the glass material. The dopant also may be selected to comprise a material that does not significantly absorb a selected wavelength of electromagnetic radiation when dispersed within the glass material, such as the wavelength to be emitted in the beam of radiation emitted by the laser. The glass material is formed into a solid body having a size and shape configured to manipulate the beam of radiation to be emitted by the laser. In some embodiments, the dopant may be selected to comprise at least one of a transition metal element, an actinide element, and a lanthanide element. Furthermore, the dopant may be dispersed within the glass material at a concentration of less than about two atomic percent (2.0 at %) in some embodiments.

In yet additional methods, the present invention includes methods of forming laser systems in which at least one optical device is formed and positioned in a pathway of an electromagnetic radiation beam to be emitted by a laser device. In forming the at least one optical device, a dopant is dispersed within a glass material, and the dopant is selected to comprise a material that facilitates the transmission of energy, which is input into the glass material by the electromagnetic radiation beam of the laser device, out from the glass material. The glass material is formed into a solid body having a size and shape configured to manipulate the electromagnetic radiation beam to be emitted by the laser device. The dopant also may be selected to comprise a material that does not absorb a wavelength of the electromagnetic radiation beam to be emitted by a laser device when dispersed within the glass material.

BRIEF DESCRIPTION OF THE DRAWINGS

While the specification concludes with claims particularly pointing out and distinctly claiming that which is regarded as embodiments of the present invention, the advantages of this invention may be more readily ascertained from the following description of the invention when read in conjunction with the accompanying drawings in which:

DETAILED DESCRIPTION OF THE INVENTION

Figure 1:
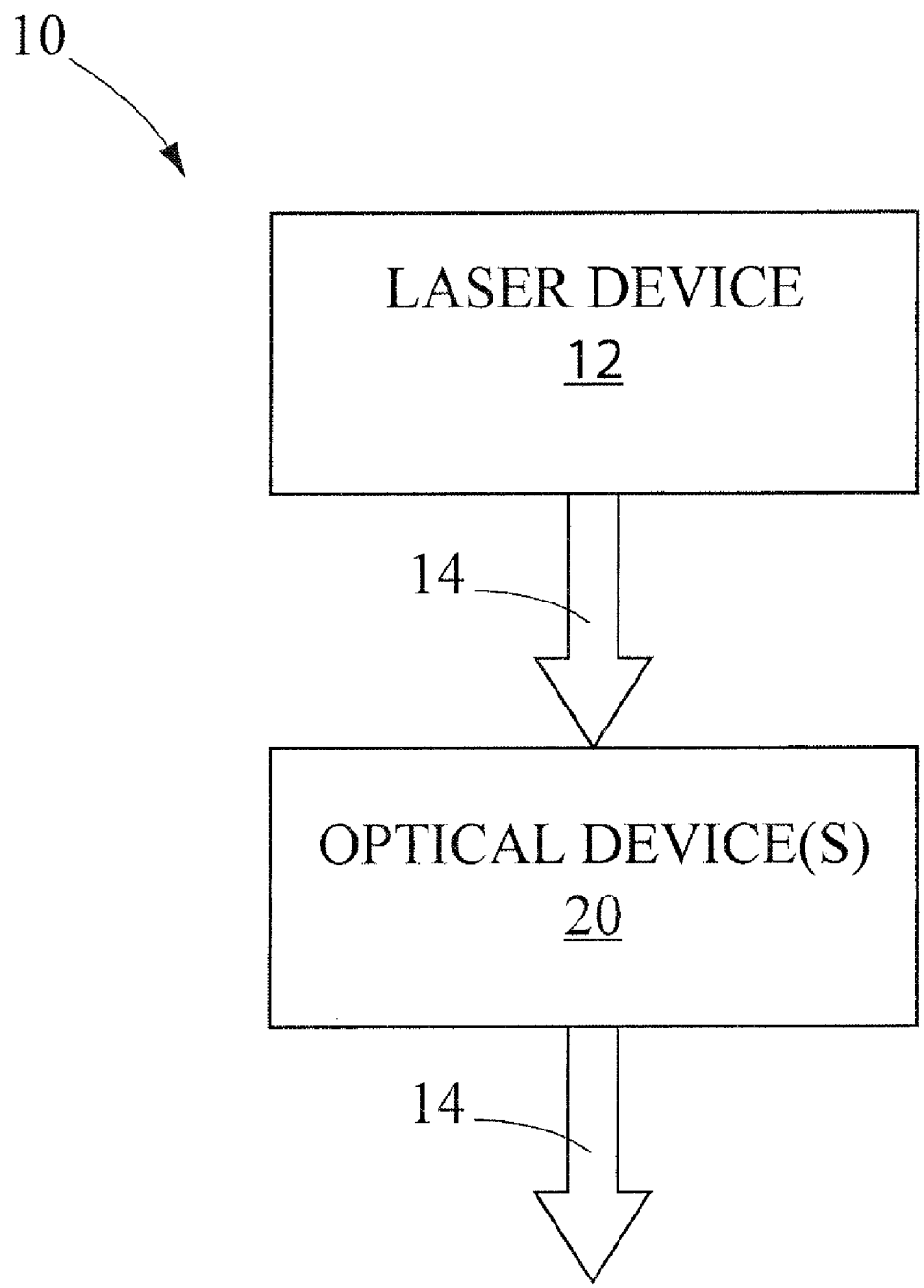
FIG. 1 is a simplified schematic diagram illustrating an embodiment of a laser system of the present invention that includes a laser device and one or more optical devices configured to manipulate a beam of electromagnetic radiation emitted by the laser device.

An example embodiment of a laser system 10 of the present invention is shown in the simplified schematic diagram illustrated in FIG. 1. The laser system 10 includes a laser device 12 and one or more optical components or devices 20, as described in further detail hereinbelow. The laser system 10 may comprise any type of laser system such as, for example, a laser machining system, a laser communication system, a laser range or distance finding system, a laser weapon system, a medical laser system, a laser system for use in astronomy or space exploration, or any other type of laser system that includes at least one laser device 12 and one or more optical devices 20.

The laser device 12 of the laser system 10 is configured to emit a beam 14 of coherent electromagnetic laser radiation. The laser device 12 may comprise any type of laser device including, for example, a gas laser (e.g., a helium-neon laser or a carbon dioxide laser), a chemical laser (e.g., a hydrogen fluoride laser), an excimer laser (e.g., a fluorine laser or a noble gas compound laser), or a solid-state laser (e.g., an yttrium aluminum garnet (YAG) laser, an yttrium orthovanadate ($YVO_4$) laser, or an yttrium lithium fluoride (YLF) laser, any of which may include a dopant such as neodymium, ytterbium, holmium, thulium, or erbium). By way of example and not limitation, the laser device 12 may comprise a neodymium doped yttrium aluminum garnet (Nd:YAG) laser configured to emit a beam 14 of electromagnetic laser radiation having a wavelength of about 1,060 nm (e.g., 1,064 nm), the laser device 12 may comprise a neodymium doped glass (Nd:Glass) laser configured to emit a beam 14 of electromagnetic laser radiation having a wavelength of about 1,060 nm (e.g., 1,063 nm), or the laser device 12 may comprise a neodymium doped phosphate glass (Nd:Phosphate Glass) laser configured to emit a beam 14 of electromagnetic laser radiation having a wavelength of about 1,060 nm (e.g., 1,054 nm). In additional embodiments, the laser device 12 may be configured to operate at harmonic frequencies of the base laser materials mentioned above. Furthermore, in some embodiments, the laser device 12 may comprise a so called "pulsed" laser device, such as, for example, a "Q-switched" laser device.

Figure 2:
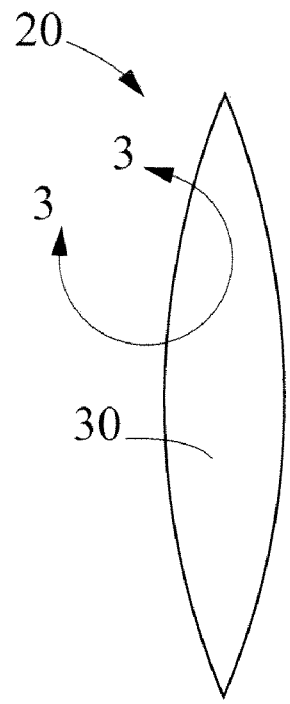
FIG. 2 is a side view of an embodiment of an optical device according to the present invention that comprises a lens.

The one or more optical devices 20 may include any device or structure configured to manipulate the beam 14 of electromagnetic radiation emitted by the laser device 12. Referring to FIG. 2, the optical device 20 may comprise a lens 30 for focusing the beam 14 or for altering a direction of propagation of the beam 14. In other words, the lens 30 may have a size and shape configured to focus the beam 14 or to alter a direction of propagation of the beam 14.

In other embodiments, an optical device 20 of the laser system 10 may comprise a mirror for reflecting at least a portion of the electromagnetic radiation of the beam 14. An optical device 20 may comprise a prism for reflecting or refracting different wavelengths of electromagnetic radiation in the beam 14 at different angles. An optical device 20 may comprise a wave plate for altering the polarization of the electromagnetic radiation of the beam 14. An optical device 20 may comprise a beam-splitter for splitting the beam 14 of electromagnetic radiation into two or more separate beams of electromagnetic radiation. An optical device 20 may comprise a window through which the beam 14 of electromagnetic radiation passes from a first spatial region to a second spatial region on an opposite side of the window.

Figure 3:
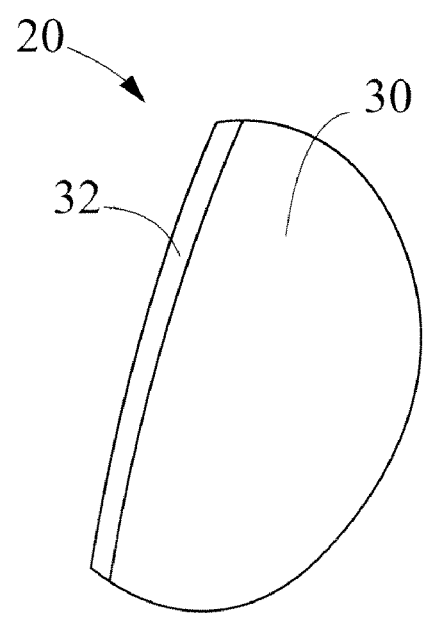
FIG. 3 is an enlarged view of the optical device shown in FIG. 2 taken along section line 3-3 shown therein and illustrates a coating on a surface of the lens, the coating also comprising an embodiment of the present invention.

Referring to FIG. 3, an optical device 20 also may comprise a coating 32 such as, for example, an anti-reflective coating (ARC) on another optical device 20, such as the lens 30, as shown in FIG. 2, or on any other optical device 20 such as, for example, those mentioned above. In other words, the coating 32 may have a material composition and an average thickness that are configured to prevent the reflection of electromagnetic radiation in a beam 14 of laser radiation that impinges on and passes through the coating 32.

Referring again to FIG. 1, embodiments of laser systems 10 of the present invention include one or more optical devices 20 that have a material composition configured to facilitate the transmission of energy (that is input into the one or more optical devices 20 by the beam 14 emitted by the laser device 12) out from the optical devices 20. For example, an optical device 20 may comprise a glass material and a dopant dispersed within the glass material, and the dopant may comprise an element, compound, or other material that facilitates the transmission of energy, which is input into the optical device 20 by the selected wavelength of laser electromagnetic radiation of the beam 14, out from the glass material and the optical device 20.

Furthermore, the dopant may comprise an element, compound, or other material that does not significantly absorb electromagnetic radiation at the wavelength of the beam 14 of electromagnetic laser radiation emitted by the laser device 12 when dispersed within the glass material. In other words, the dopant may comprise a material in which electrons (in any significant quantity) will not be excited from a lower energy state (e.g., an electron orbital or an electron energy band) into a higher energy state by the electromagnetic radiation of the beam 14 emitted by the laser device 12. The dopant also may comprise an element, compound, or other material that does not act as, or at least is not used as, a gain material for electromagnetic radiation at the wavelength of the beam 14. In other words, the dopant may comprise an element, compound, or other material that will not emit electromagnetic radiation at the wavelength of the beam 14 whether when pumped with electromagnetic radiation at the wavelength of the beam 14 or at another wavelength.

In such embodiments, the glass material may comprise a silica glass (i.e., a glass comprising $SiO_2$), a borosilicate glass (a glass formed from silica ($SiO_2$) and boron oxide ($B_2O_3$)), a "crown" glass (a composite glass comprising silica ($SiO_2$), soda ($Na_2O$), and lime (CaO)), a flint glass (a glass comprising between about 4% and about 60% lead oxide (PbO), by weight), a barium glass (a glass comprising about 4% and about 60% barium oxide (BaO), by weight. The dopant may comprise, by way of example and not limitation, at least one of a transition metal element, an actinide element, and a lanthanide element (including ions thereof). As one particular non-limiting example, the dopant may comprise neodymium (e.g., $Nd^{3+}$ ions).

As a non-limiting example, the concentration of the dopant within the glass material may be less than about two atomic percent (2.0 at %). In some embodiments, the concentration of the dopant within the glass material may be between about one-tenth of one atomic percent (0.1 at %) and about two atomic percent (2.0 at %). In yet further embodiments, the concentration of the dopant within the glass material may be between about one-tenth of one atomic percent (0.1 at %) and about one atomic percent (1.0 at %). Furthermore, in some embodiments of the invention, more than one dopant may be dispersed through the glass material, and the multiple dopants may be dispersed at the same or at different concentrations within the glass material.

Not all combinations of the glass materials and the dopants mentioned above will provide embodiments of optical devices 20 of the present invention. However, embodiments of optical devices 20 of the present invention may include particular combinations of glass materials and dopants (which, in some embodiments, may be selected from the groups of glass materials and dopants set forth above), in which the dopant facilitates the transmission of energy, which is input into the optical devices 20 by a selected wavelength of laser electromagnetic radiation in a beam 14, out from the optical devices 20, and in which the doped glass does not significantly absorb the selected wavelength of laser electromagnetic radiation in the beam 14 to be manipulated using the optical devices 20.

Suitable combinations of glasses and dopants (and suitable concentrations of the dopants within the glasses) that may be used to form embodiments of optical devices 20 of the present invention may be identified experimentally or empirically as described in further detail below.

Embodiments of optical devices 20 of the present invention may be custom fabricated for use with a particular wavelength of electromagnetic radiation to be emitted by a laser device 12 in a beam 14 of electromagnetic radiation. Therefore, a particular laser device 12 to be used in a laser system 10 that will embody the present invention may be selected or identified. The wavelength of the electromagnetic radiation in the beam 14 that will be emitted by the particular laser device 12 may be determined.

Figure 4:
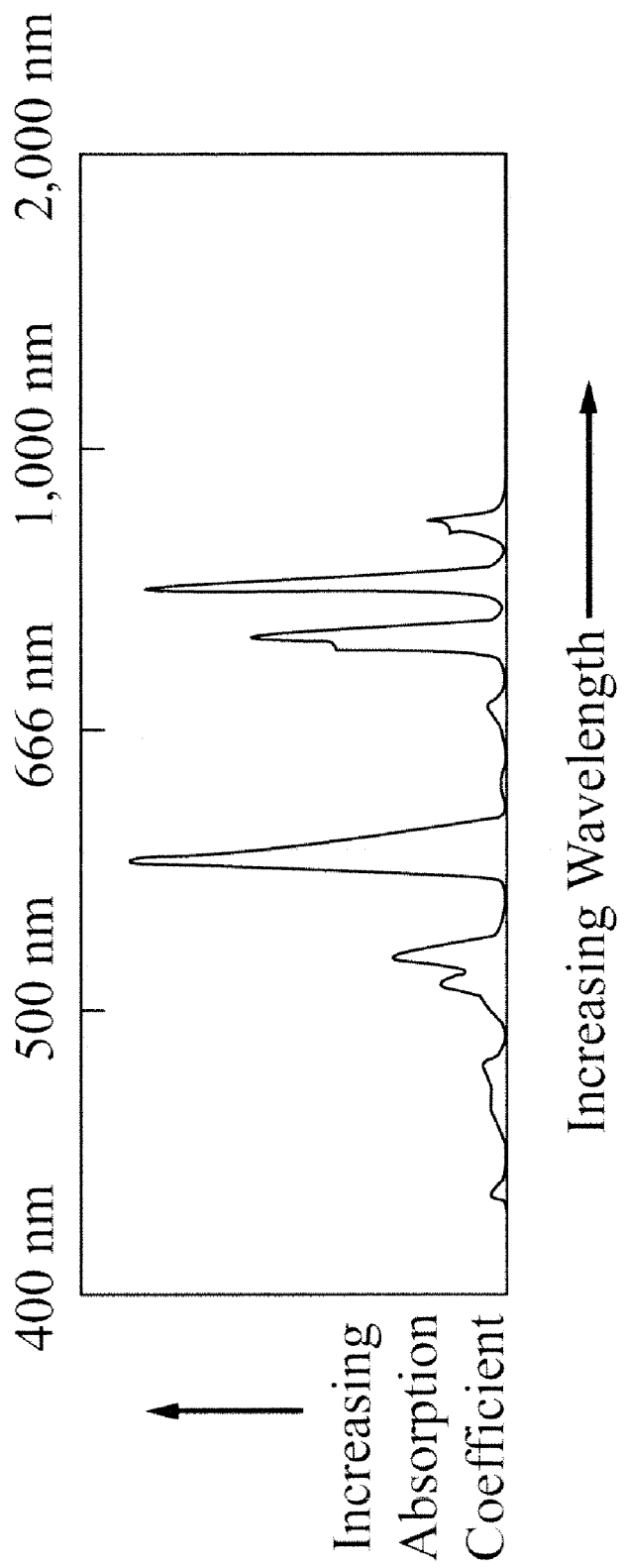
FIG. 4 is a simplified and schematically illustrated spectrum providing an example of how a graph of an absorption coefficient as a function of wavelength may appear for a sample of doped glass that may be used to form embodiments of optical devices of the present invention.

Once the wavelength of the electromagnetic radiation in the beam 14 to be manipulated by the optical device 20 has been identified (or selected), a dopant or other material that will not absorb the wavelength of the electromagnetic radiation of the beam 14 may be identified. For example, the transition metal elements, the actinide elements, and the lanthanide elements (including ions thereof) all may be considered to determine which of these elements will not significantly absorb the wavelength of the electromagnetic radiation of the beam 14. The absorption and/or transmission spectra for many elements and materials are available in chemical handbooks, desktop references, and academic literature. For example, FIG. 4 is a simplified and schematically illustrated spectrum providing an example of how a graph of an absorption coefficient as a function of wavelength may appear for a sample of a glass material, such as a phosphate glass, that has been doped with neodymium $Nd^{3+}$ ions. As shown in FIG. 4, the absorption coefficient may be relatively small for a particular wavelength of interest, such as a wavelength of about 1,060 nm, which indicates that the $Nd^{3+}$ ions do not significantly absorb electromagnetic radiation at the selected wavelength of about 1,060 nm.

If such information is not readily available for particular elements or materials being considered as a potential dopant, it may be determined experimentally or empirically whether the elements or materials under consideration will significantly absorb the wavelength of the electromagnetic radiation of the beam 14. For example, photothermal deflection measurements may be used to determine whether the elements or materials under consideration will significantly absorb the wavelength of the electromagnetic radiation of the beam 14. By way of example and not limitation, photothermal deflection measurement techniques such as that described in M. Guntau and W. Triebel, "Novel Method To Measure Bulk Absorption in Optically Transparent Materials", *Rev. Sci. Instrum.* 71(6), 2279 (Jun. 2000), may be used to determine whether the elements or materials under consideration will significantly absorb the wavelength of the electromagnetic radiation of the beam 14, the entire contents of which are incorporated herein in their entirety by this reference. In some embodiments of the present invention, the doped glass may exhibit an absorption of about ten parts per million or less of the power applied to the doped glass by the laser beam 14. In further embodiments of the present invention, the doped glass may exhibit an absorption of about one part per million or less of the power applied to the doped glass by the laser beam 14.

After identifying elements or materials that do not significantly absorb the wavelength of the electromagnetic radiation of the beam 14, those elements or materials may be further screened or tested to determine which will facilitate the transmission of energy, which is input into the optical device 20 by the selected wavelength of laser electromagnetic radiation of the beam 14, out from the optical devices 20. To determine which dopant elements or materials will facilitate the transmission of energy out from the optical devices 20, techniques such as X-ray photoelectron spectroscopy (XPS) or thermal luminescence may be used to compare the population of excited states in regions of doped and undoped glass samples after passing a beam 14 of electromagnetic radiation therethrough at the wavelength of interest (i.e., the lasing wavelength emitted by the laser device 12).

X-ray photoelectron spectroscopy (XPS) is a quantitative spectroscopic analysis method that may be used to measure the electronic state of elements within a material. A description of X-ray photoelectron spectroscopy (XPS) methods is disclosed in V. I. Nefedov, *X-ray Photoelectron Spectroscopy of Solid Surfaces*, (VSP 1988), the entire contents of which are incorporated herein by this reference. The sample to be analyzed is irradiated with a beam of X-rays while simultaneously measuring the kinetic energy and number of electrons that are ejected off from the sample due to absorption of the X-rays. The binding energy of the ejected electrons, which is related to the electronic orbital or energy state in which the electrons were disposed prior to ejection by the X-rays, may be determined by subtracting the measured kinetic energy of the ejected electrons (and the work function of the spectrometer used to detect and measure the kinetic energy of the ejected electrons) from the known energy of the X-ray photons. As a result, the binding energies of the ejected electrons may be used to determine the population of electrons in excited electronic orbitals or states within a material.

Luminescence spectroscopy (e.g., thermal luminescence spectroscopy) is another quantitative spectroscopic analysis method that may be used to measure the electronic state of elements within a material. A description of luminescence spectroscopy methods is disclosed in M. Gaft, R. Reisfeld, and G. Panczer, *Modern Luminescence Spectroscopy of Minerals and Materials*, (Springer 2005), the entire contents of which are incorporated herein by this reference. In thermal luminescence spectroscopy, for example, the sample to be analyzed is heated (e.g., to a temperature of between about 200° C. and about 400° C.). Electrons that have been excited and are disposed in higher energy orbitals or electronic states may relax into lower energy orbitals or states, and, as a result, a photon may be emitted with each electronic relaxation. The energy (and, hence, wavelength, frequency, or wave number) of each emitted photon will be primarily determined by the difference in energy between the initial higher energy orbital or state and the final lower energy orbital or state. As a result, the energy and number of the emitted photons may be used to determine the population of electrons in excited electronic orbitals or states within a material.

To identify dopants for glass materials that may be used to form embodiments of optical devices 20 of the present invention, doped and undoped glass samples may be prepared as previously described herein for identifying dopants and materials that will not significantly absorb the beam 14 of electromagnetic radiation emitted by the laser device 12. Spectroscopy techniques such as, for example, X-ray photoelectron spectroscopy (XPS) or luminescence spectroscopy then may be conducted on regions of the doped and undoped glass samples before and after (and, possibly, while) directing the beam 14 of electromagnetic radiation on those regions of the doped and undoped glass samples to determine the population of electrons in the different energy states (e.g., electronic orbitals or energy bands) of the doped and undoped glass materials. If, after inputting energy into doped and undoped glass samples using the beam 14 of electromagnetic radiation, the doped glass exhibits decreased electronic populations in higher energy states relative to the same glass without the dopant in the doped glass, then that dopant facilitates the transmission of energy that has been input into the glass material by the beam 14 out from the glass material.

Furthermore, multiple doped glass samples may be prepared using the same dopant and glass material but at different concentrations of the dopant within the glass material. These samples then may be analyzed as set forth above to determine which ranges of concentrations of the dopant within the glass will provide improved transmission of energy out from the glass material.

Embodiments of the present invention also include methods of fabricating optical devices 20 for manipulating a coherent beam 14 of electromagnetic radiation emitted by a laser device 12, as well as methods of fabricating laser systems 10 including such optical devices 20. A dopant may be dispersed within a glass material. The dopant may be selected to comprise a material that does not significantly absorb a selected wavelength of electromagnetic radiation that will be emitted in a beam 14 by a laser device 12. The dopant may be further selected to comprise a material that will facilitate the transmission of energy out from the glass material. The glass material may be formed into an optical device 20 by forming the glass material into a solid body having a size and shape configured for manipulating the beam 14 of electromagnetic radiation emitted by a laser device 12.

In some embodiments, the dopant may be dispersed within the glass material before forming the glass material into an optical device 20. For example, the dopant may be dispersed within the glass material at the time the glass material is formed. Glass materials, such as those mentioned hereinabove, may be fabricated by melting together the raw materials used to form the respective glass materials to form a molten mixture, mixing the molten mixture until it is at least substantially homogeneous, and subsequently cooling the molten mixture to form the glass material. In such methods, the dopant may be added to the molten mixture prior to cooling the molten mixture to form the glass material. Certain glass materials also may be fabricated using so-called "sol-gel" processing methods. In such methods, a gel, which may be formed from a solvent, colloidal particles, or another form of matter that includes the elements or raw materials that will be used to form the glass, is heated to drive off organic materials and sinter the remaining elements or raw materials in such a manner as to form the glass material therefrom. In such methods, the dopant may be added to the solvent or other matter used to form the gel prior to sintering the gel to form the glass material.

In other embodiments, the dopant may be dispersed within the glass material after forming the glass material into a solid body, or after forming the glass material into an optical device 20. For example, a dopant may be introduced into a solid body using a zone refining process in which the dopant material is provided adjacent to a surface of the solid body, and a volume of the solid body adjacent the dopant material is heated to allow the dopant material to diffuse into the solid body. The heated zone or region of the solid body may be moved across the solid body (e.g., back and forth across the solid body) until the dopant is at least substantially homogeneously dispersed throughout the solid body.

If the optical component 20 being formed comprises a coating, such as an anti anti-reflective coating or any other optical or special purpose coating, the glass material of the coating may be formed using a direct deposition process such as, for example, a physical vapor deposition (PVD) process (e.g., a sputtering deposition process or a thermal vapor deposition process) or a chemical vapor deposition (CVD) process.

As particular non-limiting examples, a dopant may be dispersed at least substantially homogeneously throughout the body of a silica ($SiO_2$) glass or a borosilicate glass at a concentration (of the dopant) of less than about two atomic percent (2.0 at %). In some embodiments, the dopant may be dispersed at least substantially homogeneously throughout the glass at a concentration of between about one-tenth of one atomic percent (0.1 at %) and about one atomic percent (1.0 at %). The dopant may be selected to comprise at least one of a transition metal element, an actinide element, and a lanthanide element in some embodiments. For example, the dopant may be selected to comprise neodymium. To form the optical device 20, the glass material may be formed into a solid body (before, during, or after doping with the dopant) having a size and shape configured to manipulate a beam 14 of electromagnetic radiation emitted by a laser device 12. By way of example and not limitation, the glass material may be formed into a lens, a mirror, a prism, a wave plate, a beamsplitter, a laser window, or an anti-reflective coating.

After forming one or more optical devices 20 as described hereinabove, an embodiment of a laser system 10 of the present invention may be fabricated by providing a laser device 12 configured to emit a beam 14 of electromagnetic radiation at the particular wavelength of electromagnetic radiation for which the one or more optical devices 20 were designed and fabricated to manipulate. The laser device 12 and the one or more optical devices 20 may be positioned relative to one another such that the beam 14 of electromagnetic radiation emitted by the laser device 12 will at least partially pass through, at least partially reflect, at least partially refract, focus, split, polarize, or otherwise manipulate the beam 14 of electromagnetic radiation.

Embodiments of optical devices 20 of the present invention, and embodiments of laser systems 10 including such optical devices 20, may exhibit relatively longer lifetimes relative to presently known optical devices, as embodiments of optical devices 20 may facilitate the release of energy that might contribute to degradation of the optical devices 20 out from the optical devices 20 before that energy results in or contributes to the formation of defects within the optical devices 20.

Embodiments of optical devices 20 of the present invention may find particular utility in relatively high-powered laser systems, as an increase in power imparted to an optical device by a laser device is likely to result in an increase in the likelihood that energy will accumulate within the optical device and result in the formation of defects within the optical device. Therefore, in some non-limiting embodiments of laser systems 10 of the present invention, the laser devices 12 of the laser systems 10 may be configured to emit a beam 14 having a peak power density of greater than about one megawatt per square centimeter (1.0 $MW/cm^2$). Furthermore, some non-limiting embodiments of laser systems 10 of the present invention may include a laser device 12 configured to emit a beam 14 having a peak power density of greater than about one hundred megawatts per square centimeter (100.0 $MW/cm^2$).

Embodiments of optical devices 20 of the present invention also may find particular utility in laser systems 10 that include pulsed (e.g., Q-switched) laser devices 12, as optical devices 20 that manipulate beams 14 emitted by pulsed (e.g., Q-switched) laser devices 12 may be relatively more susceptible to the build-up of energy therein relative to optical devices 20 that manipulate beams 14 emitted by non-pulsed laser devices 12. Therefore, in some non-limiting embodiments of laser systems 10 of the present invention, the laser devices 12 of the laser systems 10 may comprise a pulsed (e.g., Q-switched) laser devices 12, and an embodiment of one or more optical devices 20 of the present invention that facilitate the transfer of energy, which is input into the one or more optical devices 20 by the laser device 12, out from the one or more optical devices 20.

Embodiments of optical devices 20 of the present invention also may find particular utility in laser systems 10 that include relatively small but high-intensity laser devices 12, and in which high reliability and long life are required, such as in light detection and ranging (LIDAR) applications and space-based laser systems (where repair and replacement is difficult or impossible).

It has been discovered that the observed damage to optical devices that degrades the performance of the optical devices until they are no longer suitable for use, and, as a result, limits their useable lifetime, may be at least partially due to the build-up of energy within the optical devices in the form of excited electrons that are in excited orbitals or states that do not readily relax to lower energy states, or for which relaxation is precluded by selection rules. Furthermore, as disclosed herein, the inclusion of certain dopants within certain glass materials that will be used to form optical devices for manipulating laser beams having certain wavelengths of radiation may facilitate the dissipation of energy within the optical devices. In other words, the dopants may facilitate the transmission of energy, which is input into the glass material of the optical devices by the laser beams, out from the glass material. As a result, embodiments of optical devices and laser systems of the present invention may exhibit relatively longer useful lifetimes relative to presently known optical devices and laser systems.

Specific embodiments have been shown by way of example in the drawings and have been described in detail herein. The invention, however, may be susceptible to various modifications and alternative forms. It should be understood that the invention is not intended to be limited to the particular forms disclosed. Rather, the invention includes all modifications, equivalents, and alternatives falling within the spirit and scope of the invention as defined by the following appended claims.

What is claimed is:

1. A laser system, comprising:
   a laser device configured to emit a coherent electromagnetic radiation beam at a lasing wavelength; and
   at least one optical device positioned in a pathway of the electromagnetic radiation beam, the at least one optical device comprising:
   a glass material; and
   a dopant comprising at least one of a transition metal element, an actinide element, and a lanthanide element dispersed within the glass material, wherein the doped glass does not significantly absorb the lasing wavelength of the electromagnetic radiation beam, and wherein the dopant facilitates the transmission of energy, which is input into the at least one optical device by the electromagnetic radiation beam, out from the glass material, and wherein the dopant does not emit radiation at the lasing wavelength when pumped with another wavelength of electromagnetic radiation.

2. The laser system of claim 1, wherein the concentration of the dopant within the glass material is less than about two atomic percent (2.0 at %).

3. The laser system of claim 1, wherein the at least one optical device has a size and shape configured to manipulate the electromagnetic radiation beam.

4. The laser system of claim 1, wherein the laser device comprises a pulsed laser device.

5. The laser system of claim 1, wherein the concentration of the dopant within the glass material is greater than about one-tenth of one atomic percent (0.1 at %).

6. The laser system of claim 5, wherein the concentration of the dopant within the glass material is less than about one atomic percent (1.0 at %).

7. The laser system of claim 1, wherein the doped glass exhibits an absorption of less than ten parts per one million of a power of the coherent electromagnetic radiation beam.

8. The laser system of claim 7, wherein the doped glass exhibits an absorption of less than one part per million of the power of the coherent electromagnetic radiation beam.

9. A method of forming a laser system, comprising:
   forming at least one optical device; and
   positioning the at least one optical device in a pathway of an electromagnetic radiation beam to be emitted by a laser device;
   wherein forming the at least one optical device comprises:
      dispersing a dopant within a glass material;
      selecting the dopant to comprise a material that does not significantly absorb a wavelength of the electromagnetic radiation beam to be emitted by the laser device when dispersed within the glass material;
      selecting the dopant to comprise at least one of a transition metal element, an actinide element, and a lanthanide element;
      selecting the dopant to comprise a material that does not emit radiation at the wavelength of the electromagnetic radiation beam when pumped with another wavelength of electromagnetic radiation;
      selecting the dopant to comprise a material that facilitates the transmission of energy, which is input into the glass material by the electromagnetic radiation beam to be emitted by the laser device, out from the glass material; and
      forming the glass material into a solid body having a size and shape configured to manipulate the electromagnetic radiation beam to be emitted by the laser device.

10. The method of claim 9, wherein dispersing the dopant within the glass material comprises dispersing the dopant within the glass material at a concentration of less than about two atomic percent (2.0 at %).

11. The method of claim 9, further comprising selecting the laser device to comprise a pulsed laser device.

12. The method of claim 9, further comprising selecting the laser device to exhibit a peak power density of greater than about one megawatt per square centimeter ($1.0\ MW/cm^2$).

* * * * *